Jan. 6, 1959
W. A. WILLIAMS
2,867,103
GRIPPING ARRANGEMENTS FOR FLEXIBLE COUPLINGS
FOR POWER TRANSMISSION SHAFTS
Filed April 1, 1957
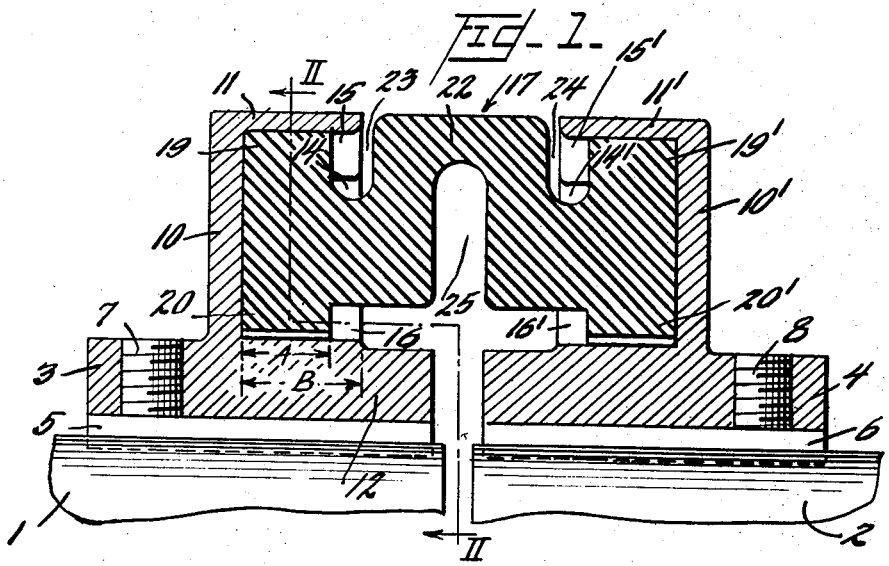
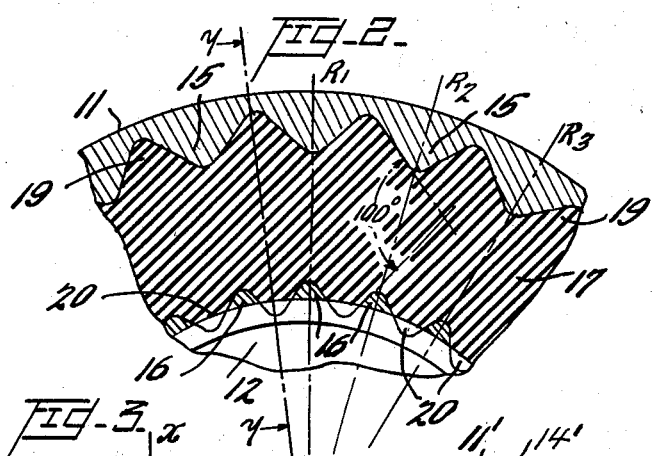
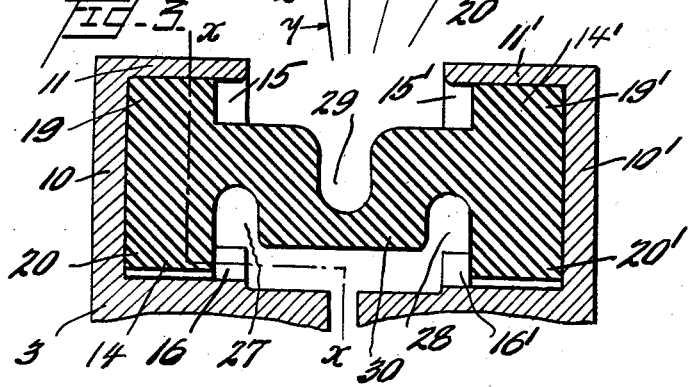
INVENTOR
William A. Williams,
BY Sommers & Young
ATTORNEYS

United States Patent Office 2,867,103
Patented Jan. 6, 1959

2,867,103

GRIPPING ARRANGEMENTS FOR FLEXIBLE COUPLINGS FOR POWER TRANSMISSION SHAFTS

William A. Williams, Philadelphia, Pa., assignor to T. B. Wood's Sons Company, a corporation of Pennsylvania Application April 1, 1957, Serial No. 649,722

5 Claims. (Cl. 64—11)

This invention relates to improvements in flexible couplings for power transmission shafts, and particularly to couplings of the general type disclosed in my co-pending patent application, Serial No. 565,147, filed February 13, 1956, of which the present application is a continuation-in-part.

An object of the present invention is to provide a construction of such couplings which will be capable of providing a very great cushioning effect against abrupt variation of torsional load and also which will be especially yielding both angularly and transversely to accommodate for misalignment of the coupled shaft either angularly or axially.

Another object of this invention is to provide a flexible connector having end portions which are so formed as to cooperate with corresponding formed portions of the coupling hubs as to provide a jamming action to tighten the connection between said connector and hubs, and in which, however, the said formations of said flexible connector end portions do not extend axially beyond the corresponding formations of said hubs, that is, are interrupted short of the axial extent of said formations of the hubs. By this construction the flexible formations of the connector do not tend to wrap around the ends of the hub formations, and therefore do not tend to pull the connector ends axially out of engagement with the formed portions of the coupling hubs when the connector is subjected to torsional stress and deformation under working load. As a result of this arrangement the necessity of providing an end thrust against the connector sleeve to prevent the sleeve from becoming disengaged from the hubs is avoided.

Two embodiments illustrating the present improvements are illustrated by way of example in the accompanying drawings:

Figure 1 is an axial sectional view on the line Y—Y of Fig. 2 of approximately the upper half of a shaft connector embodying the present improvements;

Figure 2 is a transverse sectional view on line II—II of Fig. 1;

Figure 3 is an axial sectional view similar to Fig. 1 of a modified embodiment of the invention, a sectional view of which on line x—x is similar to Fig. 2.

In the accompanying drawing numerals 1 and 2 represent respectively, shafts to be connected together in axial alignment or approximately so. The end portions of these shafts have coupling hubs 3, 4 connected thereto by means of keys 5 and 6 and set screws 7 and 8 bearing on said keys respectively. The coupling hub 3, on the left, as viewed in Fig. 1, is provided with a radially extending flange 10 which at its outer edge is provided with an axially extending flange 11 projecting toward opposed coupling hub 4 on shaft 2. These two flanges 10 and 11 together with the base collar 12 of coupling hub 3 form a cup-like member having an annular opening 14 open toward the opposite coupling member 4.

Viewing coupling hub member 3 from the right in either Fig. 1 or Fig. 3 it will be noted sets of teeth 15 and 16 are provided on the inner surface of flange 11 and the outer surface of base collar 12. The teeth of both of these sets are provided with faces which are inclined to the radial, and, thus, constitute wedge-like members which engage against similarly shaped sets of teeth 19 and 20 on the end portions of coupling connector 17, formed of elastic material, such as molded rubber, and cause wedging engagement between the teeth of the connector and the teeth of the hubs when subjected to torsional driving forces. The coupling hub 4 is provided with a radial flange 10' similar to flange 10 of hub 3, and with an axially extending flange 11' at the outer edge of 10, similar to flange 11 but extending in the opposite axial direction. The hub 4 is thus provided with an annular recess 14' facing in the opposite direction to the corresponding recess 14 in hub 3. The coupling hub 4 is also similar to hub 3 in that the inner and outer surfaces of the recess 14' are provided with sets of teeth 15' and 16' respectively, which teeth have similar shape as the teeth of sets 15 and 16 of hub 3. The right hand end portion of connector 17 is similar to the left hand end thereof.

One of the particularly important features of the present improvements resides in the relationship of the axial lengths of the sets of teeth 15 and 16, and 15' and 16' of the coupling hubs 3 and 4 on the one hand and the teeth of sets 19 and 20, and 19' and 20'. It is to be observed, for instance, from Figs. 1 and 3 that the axial length A of sets of teeth 19 and 20 and 19' and 20' is less than the axial length B of sets 15 and 16, and 15' and 16', and that they terminate short of the free axial extremities of the teeth of sets 15 and 16 and 15' and 16'. The purpose and result of this is that the teeth of sets 19 and 20 do not have a tendency to wrap around the edges of the teeth of said sets 15 and 16, and 15' and 16' and become dislodged when subjected to torsional stress and deformation. This eliminates the wear which would be incidental to such tendency to wrap around the ends of said teeth. It also avoids the necessity of subjecting the flexible connector to end thrust between the hubs to prevent disengagement from the hubs.

It is also to be observed that it is preferable to form the peaks and valleys of the teeth of the inner and outer sets of teeth of both the coupling hubs and of the flexible connector on corresponding radii as illustrated by lines $R_1$, $R_2$ and $R_3$ in Fig. 2.

A further desirable feature of the invention is that the angles formed by extending planes of the faces of the corresponding teeth of the inner and outer sets of teeth are of the order of about 100° to each other.

Intermediate of the two end portions of the flexible connector the central portion is formed two axially spaced annular grooves 23 and 24 in its outer face and a central annular groove 25 in its inner face which grooves together form the central portion with an annular corrugation 22 which greatly increases the ability of the flexible connector 17 to yield to variations in torque load and to flex angularly and radially to accommodate for lack of alignment of the shafts between which drive is transmitted.

Figure 3 of the drawing represents diagrammatically an embodiment similar to that of Fig. 1 except that the two axially spaced annular grooves 27 and 28 are in the inner surface of the middle portion of the flexible connector, while the central annular groove 29 is in the outer surface, and the effect of this reversal is that the corrugation 30 resulting from said grooves bulges in the opposite direction as corrugation 22 of Fig. 1

I claim:

1. In a flexible coupling for connecting rotatable power transmission shafts end to end, a coupling hub mounted on the adjacent end portions of said shafts, said hubs each having walls forming an annular opening therearound and opening toward each other, the inner and outer walls of said hubs forming said opening being provided with sets of axially extending teeth, having side walls arranged at angles to the respective radii, a tubular flexible connector extending between said coupling hubs and having end portions extending into said annular openings, said end portions having inner and outer sets of teeth corresponding in cross sectional shape and size to the corresponding teeth of said inner and outer walls of said hubs, said teeth of said connector being shorter in axial extent than the teeth of said hubs and terminating axially inwardly of said openings relative to the terminations of corresponding teeth of said hub walls.

2. A flexible coupling according to claim 1 and in which the angle formed by planes in extension of corresponding teeth of said inner and outer sets of said hubs and said connector is about 100°.

3. A flexible coupling according to claim 1, and in which the portion of said flexible connector between said coupling hubs is formed with an annular corrugation to increase the torsional, angular, and radial flexibility thereof.

4. A flexible coupling according to claim 3, and in which said corrugation bulges outwardly.

5. A flexible coupling according to claim 3, and in which said corrugation bulges inwardly.

References Cited in the file of this patent

UNITED STATES PATENTS

| | | |
|---|---|---|
| 1,501,187 | Rayfield | July 15, 1924 |
| 2,166,376 | Saurer | July 18, 1939 |
| 2,174,010 | Patterson | Sept. 29, 1939 |
| 2,186,305 | Orr | Jan. 9, 1940 |